Jan. 13, 1959 A. H. CROUCHER 2,868,342
CLUTCHES, BRAKES AND THE LIKE
Filed Sept. 18, 1953 2 Sheets-Sheet 1
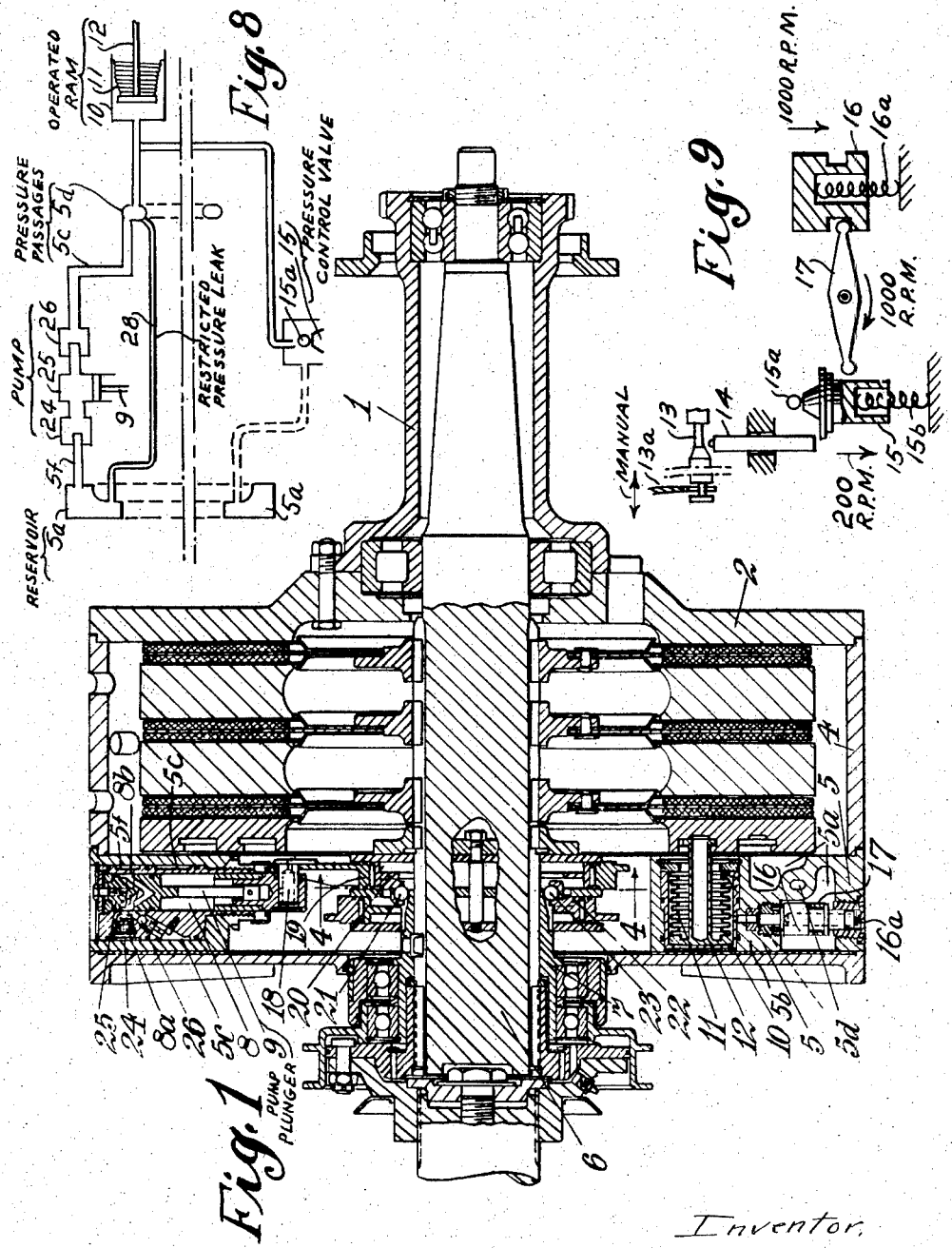
Inventor,
Antony H. Croucher,
by Hall & Houghton
Attorney.

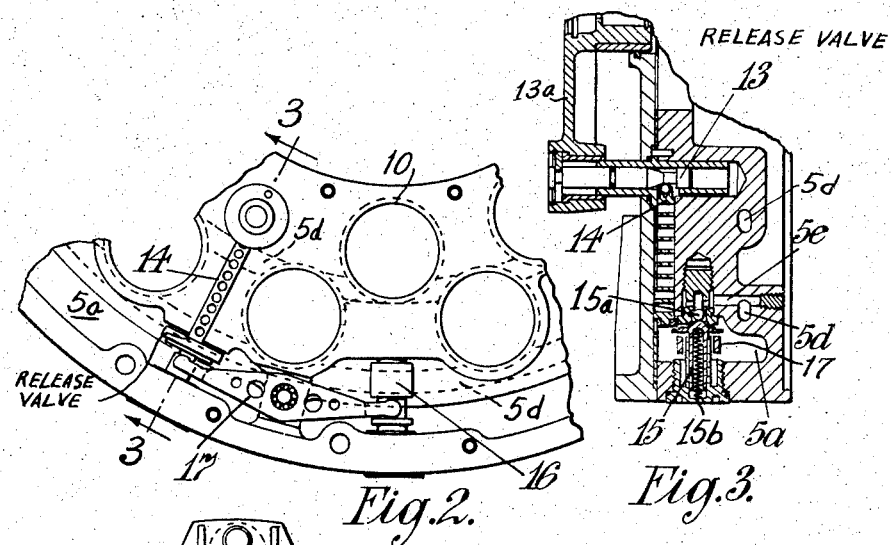
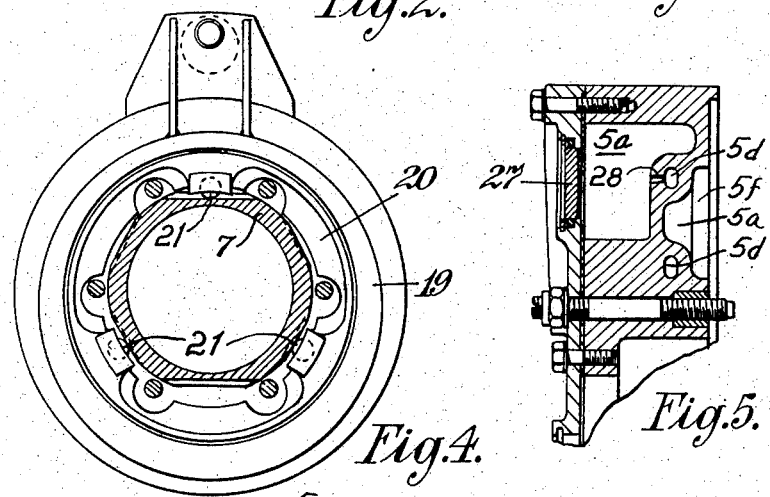
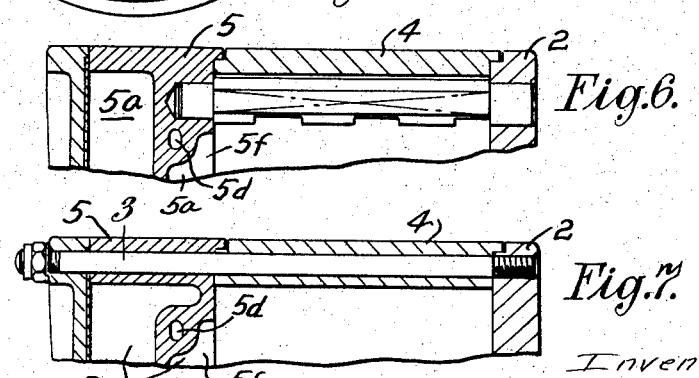

United States Patent Office 2,868,342
Patented Jan. 13, 1959

2,868,342

CLUTCHES, BRAKES AND THE LIKE

Antony H. Croucher, Esher, England

Application September 18, 1953, Serial No. 381,084

Claims priority, application Great Britain
September 22, 1952

5 Claims. (Cl. 192—103)

This invention relates to clutches and the like and more especially to clutch or like operating means of the kind in which the clutching or like operation is effected by the operation of a hydraulic pump or pumps adapted to pump fluid to actuate ram or like means for applying the clutch, brake or the like.

The invention relates more particularly to such operating means of the kind in which the pump or pumps is or are embodied in the rotating part or one of the rotating parts and is actuated by differential movement between the parts.

When the arrangement described is incorporated in a clutch, e. g. for a vehicle, the difficulty arises that if the clutch is arranged to be operated, e. g. by means of a centrifugally operated valve on the engine side of the clutch, then it is not available for effecting a towed start of the vehicle, while if the clutch is operated by manually actuated means for a towed start the load on the engine when it fires will be such as to cause the engine at once to stall.

According to the present invention valve means are provided for engaging the clutch while the vehicle and engine are stationary, for disengaging the clutch at a relatively low speed of revolution of the engine, e. g. below idling speed and for re-engaging it again at a higher speed, e. g. above idling speed.

In this way the engine can be started by towing and when it fires it automatically releases itself from the transmission so that it does not stall, and can be re-engaged at will by increasing the rate of revolution to a specific value above idling speed.

Embodiments of the invention will be described with reference to the accompanying drawings, in which:

Figure 1 is an axial cross-section of a multiple plate clutch embodying the invention.

Figure 2 is a detail of an end view with the cover removed.

Figure 3 is a section on the line 3—3 of Figure 2.

Figure 4 is a section on the line 4—4 of Figure 1.

Figure 5 is a section through the sight glass and adjusting studs.

Figure 6 is a section through a driving pin.

Figure 7 is a section through a casing stud.

Figure 8 is an exploded simplified diagram of the hydraulic clutch operating circuit of the illustrative embodiment; and Figure 9 is a simplified diagram of the manual and automatic means employed in the illustrative embodiment for controlling the clutch engagement thereby as aforesaid.

In the illustrative embodiments (referring to Figs. 8 and 9 and the other figures hereinafter noted), the engine shaft (Figure 1) is shown bolted to the flywheel 2. Also to the flywheel 2, by means of circumferential bolts 3 (see Figure 7) are secured, adjacent one another, the clutch housing 4 and the clutch operating mechanism casing 5 so that these rotate together.

Rotatably supported within the shaft 1 is the output shaft 6 which slidably carries the clutch operating member 7 by means of spline teeth.

The clutch housing 4 contains a clutch of a conventional form.

The clutch operating mechanism casing 5 is formed with an oil reservoir 5a (Figs. 5–7 and lower part of Fig. 1), ram cylinders 5b (lower part of Fig. 1), a radial pump aperture or apertures 5c and connecting passages to be described.

The pump unit or units inserted in the pump aperture or apertures 5c comprise a cylinder 8 in which operates a plunger 9.

The ram cylinders 5b (lower part of Fig. 1) have within them cylinders 10 containing flexible metal bellows 11 and a ram member 12.

A release valve (Figure 3) is provided with two forms of centrifugal control and also manual control.

The manual control member of the release valve is the dumb-bell shaped member 13 (Figure 3) which over a rod 14) with parallel holes along its length for lightening it) controls the position of the weight or plunger 15 of the release valve ball 15a. This plunger is spring-loaded by spring 15b to hold the release valve closed up to 200 R. P. M. for tow starting. Member 13 is operated by member 13a which slides on the axis of shaft 6 and is controlled by suitable remote control linkage (not shown).

The weight or plunger 16 (Figure 2) mounted so as to be radially slidable is spring-loaded so that at 1000 R. P. M. it moves outwards under centrifugal force against the spring load of spring 16a (Figure 1) to permit the rotation of the centrally pivoted lever 17 which presses-in the plunger 15 to close the release valve.

The plunger or plungers 9 (see Figure 1) of the pumps are operated by means of an eccentric arrangement.

The plungers 9 are secured over needle bearings to axially directed pins 18 which are secured to a sleeve 19 which runs over needle bearings on an eccentric 20 of variable eccentricity and is carried around together with the casing 5.

The variable eccentric rides on three balls 21 which are in contact with flats cut on the clutch operating member 7 in planes inclined to the axis thereof. By sliding movement of the member 7 on the shaft 6 the eccentricity is varied.

To obtain dynamic balance a further variable eccentric 22 may be provided for another pump unit (not shown) of identical construction and operation as the first and disposed in a circumferentially displaced position in relation thereto which rides on three balls 23 on flats on the clutch operating member 7 interspaced with those used for the balls 21.

In operation starting from a starting condition of engine shaft 1 and output shaft shown in Figure 1, the clutch operating member 7 is moved to the right by any suitable means (e. g. clutch pedal, gear change lever, and so on) to give the desired degree of eccentricity.

The eccentricity of eccentrics 20 and 22 ensures that as the flywheel rotates with shaft 6 stationary or moving at a lesser speed, the plungers 9 are reciprocated in cylinders 8 giving the pumping action of fluid from reservoir 5a to ram cylinder 10.

Assuming now the start is a towed one, then the drive on the shaft 6 will turn the member 7 and rotate the eccentrics 20 and 22 to operate the pumps by reciprocating the plungers 9. Fluid will be drawn from the reservoir 5a through the circumferential connecting passage 5f which joins therewith (see Figure 5) and which extends around the bore of cylinder 8 into the passage 8a leading past the spring-loaded valve 24 (Figure 1) into the chamber 8b in the cylinder pump intake 8 which is closed by the cap 25. From there it will be forced by the pump past the spring-loaded pump outlet ball valve 26 into the radial passage 5c which connects over interconnecting circumferential passages 5d (Figure 1) with the ram cylinder 10 (see Figure 2). Valves 24 and 26 ensure that liquid can only be drawn into the cylinder from the reservoir 5a and can only be expelled from the cylinder by the passage 5c.

Fluid pressure in the cylinders 10 operates the ram members 12 to engage the clutch and hence drive the engine shaft 1.

When the engine fires and the engine shaft speed reaches 200 R. P. M. then the release valve opens by the outward movement of the plunger 15 (Figure 3) under centrifugal force against the spring 15b releasing ball 15a, weight 16 being held in at this time by the stronger spring 16a. Fluid from the cylinders 10 is then evacuated through passages 5d and the passage 5e (Figure 3) past the ball 15a back to the reservoir 5a. The clutch is then released.

At an engine speed of 1000 R. P. M. the plunger 16 (Figure 2) moves out against spring 16a to allow the lever 17 to depress the plunger 15 and press the ball 15a on its seating thereby causing the re-engagement of the clutch.

Manual restoration of the clutch operating member 7 (Figure 1) will at any time stop the operation of the pump and will release the clutch by the dumb-bell member 13 (Figure 2) forcing outwards the rod 14 and hence the plunger 15.

The sighting glass 27 (Figure 5) is provided for gauging the amount of fluid in the reservoir 5a of the casing 5.

To ensure that the clutch only takes up the desired amount of torque at all times, a predetermined leak 28 (Figure 5) or a release valve may be provided in the fluid circulating system.

It is to be understood that the clutching, braking and like arrangement described can be used without the variable eccentric arrangement.

Various modifications may be made within the scope of the invention.

I claim:

1. In a clutch, a rotating part, a hydraulic pump embodied therein, means for operating said pump, a fluid reservoir in a radially outer region of the rotating part, a pump intake leading from the reservoir, a ram chamber in a radially inner region of the rotating part, a ram in the chamber, a pump outlet leading to the ram chamber, a ram chamber outlet including a normally closed release valve leading to the reservoir, a spring-loaded radially outwardly movable weight mounted in said rotating part and normally closing the release valve, a lever pivotally mounted on the rotating part and closingly engaging with the release valve at one side of the pivot when its other side is moved outward and a second spring-loaded radially outwardly movable weight mounted in the rotating part for moving outwards under centrifugal force and engaging said other side of the lever, said first weight moving out against its spring loading at one predetermined speed of revolution of the rotating part to open the release valve and said second weight moving out against its spring loading at a higher predetermined speed of revolution to act on the lever to press in the first weight and close the release valve.

2. The structure as claimed in claim 1, in which manually operable means are also provided for opening said release valve.

3. The structure as claimed in claim 1, in which a pump is operated by variable eccentric means.

4. The structure as claimed in claim 1, in which the predeterimned leak is provided between the ram chamber and reservoir.

5. In a device of the class described, a rotating part comprising a hydraulic system including a reservoir, a ram chamber, a ram operable by hydraulic pressure in said chamber, a pump for drawing hydraulic fluid from said reservoir and delivering it to said ram chamber, normally closed valve means for controlling return of pressure fluid from said ram chamber to said reservoir, first centrifugally operated means for opening said valve means when said rotating part attains a first predetermined speed of rotation, and second centrifugally operated means for closing said valve means when said rotating part attains a second, higher, predetermined speed of rotation.

References Cited in the file of this patent

UNITED STATES PATENTS

| 731,483 | Matson | June 23, 1903 |
| 2,178,050 | Peterson | Oct. 31, 1939 |
| 2,297,480 | Kratzmann | Sept. 29, 1942 |
| 2,381,786 | Tyler | Aug. 7, 1945 |
| 2,719,621 | Clough | Oct. 4, 1955 |

FOREIGN PATENTS

| 637,251 | Great Britain | May 27, 1948 |